United States Patent
Ananthanarayanan et al.

(10) Patent No.: US 9,621,561 B2
(45) Date of Patent: Apr. 11, 2017

(54) ENABLING TRUSTED CONFERENCING SERVICES

(75) Inventors: Krishnan Ananthanarayanan, Bothell, WA (US); Sankaran Narayanan, Redmond, WA (US); Dhigha A. Sekaran, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 909 days.

(21) Appl. No.: 12/394,061

(22) Filed: Feb. 27, 2009

(65) Prior Publication Data

US 2010/0223389 A1    Sep. 2, 2010

(51) Int. Cl.
| | |
|---|---|
| G06F 15/16 | (2006.01) |
| H04L 29/06 | (2006.01) |
| G06F 21/57 | (2013.01) |
| H04M 3/56 | (2006.01) |
| H04L 12/18 | (2006.01) |
| H04M 3/38 | (2006.01) |

(52) U.S. Cl.
CPC ............ *H04L 63/104* (2013.01); *G06F 21/57* (2013.01); *H04L 12/1822* (2013.01); *H04M 3/56* (2013.01); *G06F 2221/2101* (2013.01); *G06F 2221/2117* (2013.01); *G06F 2221/2141* (2013.01); *G06F 2221/2147* (2013.01); *G06F 2221/2149* (2013.01); *H04L 12/1813* (2013.01); *H04M 3/38* (2013.01)

(58) Field of Classification Search
CPC .. H04L 12/1822; H04L 12/1813; H04M 3/56; G06F 21/57

USPC .................................................. 709/203, 206
See application file for complete search history.

(56) References Cited

U.S. PATENT DOCUMENTS

| | | | |
|---|---|---|---|
| 6,977,933 B2* | 12/2005 | Soncodi et al. | 370/392 |
| 7,007,235 B1* | 2/2006 | Hussein et al. | 715/751 |
| 7,480,723 B2* | 1/2009 | Grabelsky et al. | 709/228 |
| 7,591,013 B2* | 9/2009 | Bhargava et al. | 726/14 |
| 7,603,413 B1* | 10/2009 | Herold et al. | 709/204 |
| 7,822,974 B2* | 10/2010 | Kinser et al. | 713/156 |
| 8,126,968 B2* | 2/2012 | Rodman et al. | 709/205 |
| 2002/0062347 A1* | 5/2002 | Low | G06Q 30/06 709/204 |
| 2003/0012149 A1* | 1/2003 | Maggenti et al. | 370/260 |
| 2003/0074410 A1* | 4/2003 | Kay et al. | 709/206 |

(Continued)

OTHER PUBLICATIONS

Wenjun Wu, Hasan Bulut, Ahmet Uyar, and Geoffrey C. Fox. "A Web-Services Based Conference Control Framework for Heterogenous Collaboration", 2003, 6 pages.*

(Continued)

*Primary Examiner* — James Conaway

(57) ABSTRACT

Architecture for providing a superuser privilege in a conferencing environment. A pre-configured entity such as a bot program receives special conferencing privileges. A request can be identified as originating from a trusted service and an associated predetermined set of privileges passed to the service. The trusted service can impersonate a user, and join a conference using its own identity or using the identity of a user. Conference control rules can be enforced on the trusted user (e.g., no other users can eject or mute this entity). Moreover, the trusted service can (optionally) hide itself from the conference roster to remain invisible to all participants.

12 Claims, 9 Drawing Sheets

(56) References Cited

U.S. PATENT DOCUMENTS

| | | | |
|---|---|---|---|
| 2003/0177017 A1* | 9/2003 | Boyer et al. | 705/1 |
| 2003/0220972 A1* | 11/2003 | Montet et al. | 709/204 |
| 2004/0174830 A1* | 9/2004 | Koskelainen et al. | 370/260 |
| 2005/0027805 A1* | 2/2005 | Aoki | G06Q 10/109 709/206 |
| 2005/0071440 A1* | 3/2005 | Jones et al. | 709/218 |
| 2006/0112004 A1* | 5/2006 | Kim | G06Q 30/08 705/37 |
| 2006/0150119 A1* | 7/2006 | Chesnais et al. | 715/810 |
| 2006/0235966 A1* | 10/2006 | Rossow et al. | 709/224 |
| 2007/0073880 A1* | 3/2007 | Krishnakumar et al. | 709/225 |
| 2007/0150444 A1* | 6/2007 | Chesnais et al. | 707/3 |
| 2007/0208806 A1* | 9/2007 | Mordecai | G06Q 10/10 709/204 |
| 2007/0253409 A1* | 11/2007 | Fu | H04L 12/185 370/389 |
| 2008/0040187 A1* | 2/2008 | Carraher et al. | 705/9 |
| 2008/0043986 A1* | 2/2008 | Darby | H04M 3/5322 379/265.09 |
| 2008/0133674 A1* | 6/2008 | Knauerhase | H04L 12/581 709/206 |
| 2008/0256182 A1* | 10/2008 | Sekaran | H04L 12/1822 709/204 |
| 2008/0307038 A1* | 12/2008 | Nichols et al. | 709/203 |
| 2008/0320085 A1* | 12/2008 | Bouilloux-Lafont | H04N 7/17318 709/206 |
| 2009/0006548 A1* | 1/2009 | Ramanathan et al. | 709/204 |
| 2009/0055497 A1* | 2/2009 | Dickerson et al. | 709/207 |
| 2010/0149306 A1* | 6/2010 | Gopal et al. | 348/14.09 |
| 2010/0325561 A1* | 12/2010 | Archambault | H04L 12/1818 715/753 |
| 2011/0185025 A1* | 7/2011 | Cherukuri | H04L 12/1813 709/206 |
| 2012/0030301 A1* | 2/2012 | Herold | G06Q 10/10 709/206 |
| 2013/0022190 A1* | 1/2013 | Oliver et al. | 379/202.01 |
| 2014/0340469 A1* | 11/2014 | Swanson et al. | 348/14.09 |
| 2016/0080436 A1* | 3/2016 | McKee Cooper | H04L 65/1086 715/756 |

OTHER PUBLICATIONS

Nordicbots, Nordicbots Documentation, Jun. 24, 2007 https://web.archive.org/web/20070624102925/http://www.nordicbots.com/?id=111.* mfoss, Shared Roster Groups Screenshots, Apr. 19, 2005, https://www.ejabberd.im/screenshots-shared-roster-groups.*

* cited by examiner

ENABLING TRUSTED CONFERENCING SERVICES

BACKGROUND

In a typical conferencing system users are either presenters or attendees. Authentication is achieved by using either an enterprise identity or a system-supplied conference admission passcode. This two-level user model proves to be insufficient for building richer conferencing services that utilize automated services. For example, requests cannot be sent from a trusted conferencing application (a "trusted bot") without being challenged since the communication server cannot identify that the request is originating from a trusted conferencing application. In such a situation, existing mechanisms lack the ability to distinguish between the user impersonations and trusted bots such that the trusted bot can join the conference, send requests using its own application identity, and hide from the conferencing roster, for example, thereby limiting opportunities for a richer user experience in conferencing and real-time communications.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The architecture provides a real-time communications and conferencing system that facilitates trusted conferencing-related services using a protocol such as SIP (session initiation protocol) based on a "superuser" privilege created and applied in a conferencing environment. A pre-configured software entity (e.g., service) such as a "bot" (a software agent that performs automated actions) can receive the superuser conferencing privileges such as being able to join any conference using the service's own identity and join a conference even when the conference is locked by the presenter, for example. No superuser privileges are assigned for joining on behalf of a user (impersonating).

A request can be identified as originating from the trusted service and an associated predetermined set of privileges passed to the service. The conferencing system can enforce special conference control rules on the trusted user (e.g., no other users can eject or mute this entity), and provide full superuser privileges to this trusted service. Moreover, the trusted service can (optionally) hide itself from the conference roster to remain invisible to all participants.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates a call flow diagram for impersonating a PSTN user dial-in.

DETAILED DESCRIPTION

Figure 1:
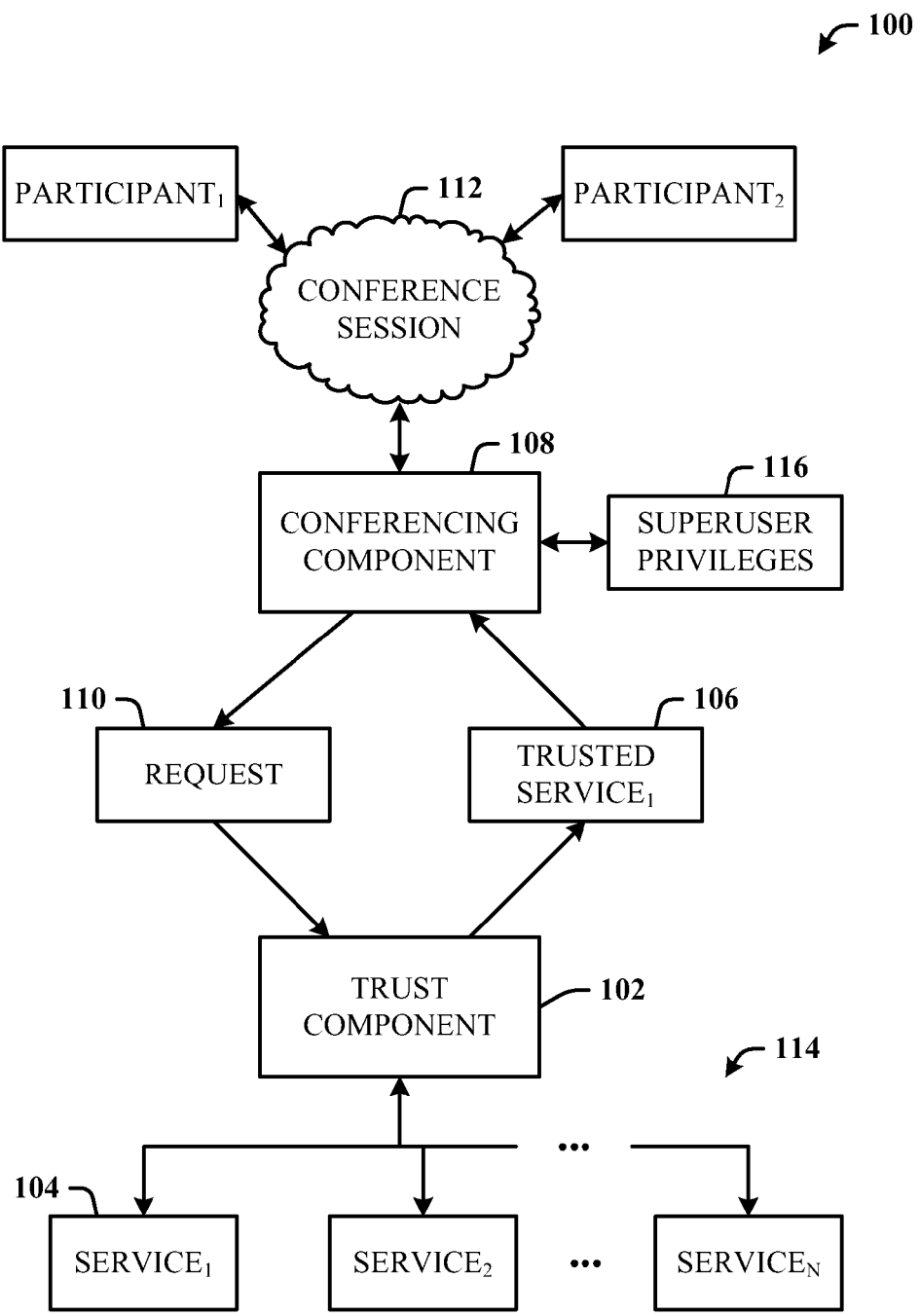
FIG. 1 illustrates a computer-implemented communications system in accordance with the disclosed architecture.

Services are employed for use in a wide variety of environments. Consider a bot application (e.g., a software agent that performs automated actions) that announces the names of people that join a conference for the benefit of the attendees connected via telephones that do not have access to the conference roster. The bot has an identity and needs to join any conference that utilizes its services irrespective of the nature or status of the conference. At the same time, it is desirable to make the bot appear invisible to other users in the conference because the bot is not really a conference "participant" in the conventional sense of the term.

One attempt to resolve this problem is to make the bot a preset presenter such that the bot can join the conference irrespective of whether the conference is locked or not. However, this proves to a difficult implementation because the presenter list is configured by the conference organizer. This requires scheduling clients to be modified to make the bots as presenters for all conferences. In this case, the list of all bot applications would have to be known to the scheduling client. This also requires bot clients to be modified, since existing bots cannot join previously scheduled conferences. Moreover, new bots cannot join previously scheduled conferences.

The disclosed architecture provides a real-time communications and conferencing system that facilitates the creation of trusted conferencing-related services using a protocol such as SIP (session initiation protocol). More specifically, the trusted service is assigned a superuser privilege for use in the conferencing environment. A pre-configured entity such as the bot can be treated as a trusted service, as well as receive the superuser conferencing privilege(s). The trusted service can impersonate a user. The superuser trusted service can join a conference using its own identity, join a locked conference, assume a presenter role, and so on.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented communications system 100 in accordance with the disclosed architecture. The system 100 includes a trust component 102 for configuring a regular service 104 as a trusted service 106, and a conferencing component 108 for processing a request 110 for the regular service 104 as part of a conference session 112 and treating the regular service 104 as trusted for the session 112. The regular service 104 can be one of many regular services 114 that can be processed as trusted services for use in the session 112. The regular service 104 can be employed for one session participant (a first Participant$_1$) or for multiple participants (the first Participant$_1$ and a second Participant$_2$).

The conferencing component 108 can also apply superuser privileges 116 to the trusted service 106. The trusted service 106 impersonates a user seeking to become a session participant. The trusted service 106 self-joins the session based on an associated service identity or a user identity. The conferencing component 108 can also impose conference control rules on the trusted service 106 or other trusted services provided for the session 112. The trusted service 106 can prevent itself from being viewed by the conference participants. The trusted service 106 can also request a trusted service role.

Put another way, the communications system 100 comprises the trust component 102 for configuring the regular service 104 as the trusted service 106, and the conferencing component 108 for processing requests (e.g., request 110) for the regular service 104 as part of the conference session 112 and applying the superuser privileges 116 to the trusted service 106 for interaction with the session 112. The trusted service 106 impersonates a user seeking to become a session participant. The trusted service 106 self-joins the session 112 based on an associated identity. The trusted service 106 prevents itself from being viewed by conference participants or requests a trusted service role.

Figure 2:
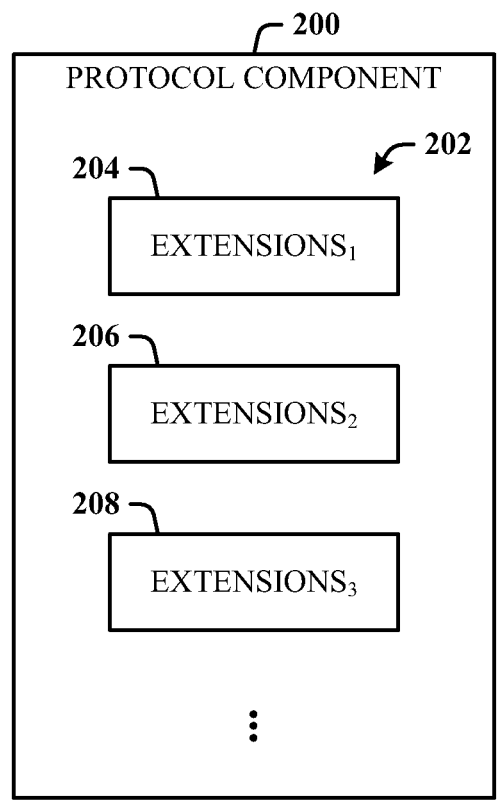
FIG. 2 illustrates a protocol component that facilitates the utilization of protocol extensions for trusted service processing.

FIG. 2 illustrates a protocol component 200 that facilitates the utilization of protocol extensions 202 for trusted service processing. For example, a first set 204 of protocol extensions enable the trusted services to bypass the regular user authentication on the server. This causes the server to allow requests originating from these entities without a challenge for credentials. A second set 206 of protocol extensions enables the trusted services to request a trusted role. A third set 208 of protocol extensions enable the trusted services to impersonate a user. Other extensions can be provided as desired.

The protocol extensions can be based on the C3P (centralized conference control protocol) as well as SIP to allow the trusted service to request a trusted role, to impersonate a user, and bypass user authentication.

Figure 3:
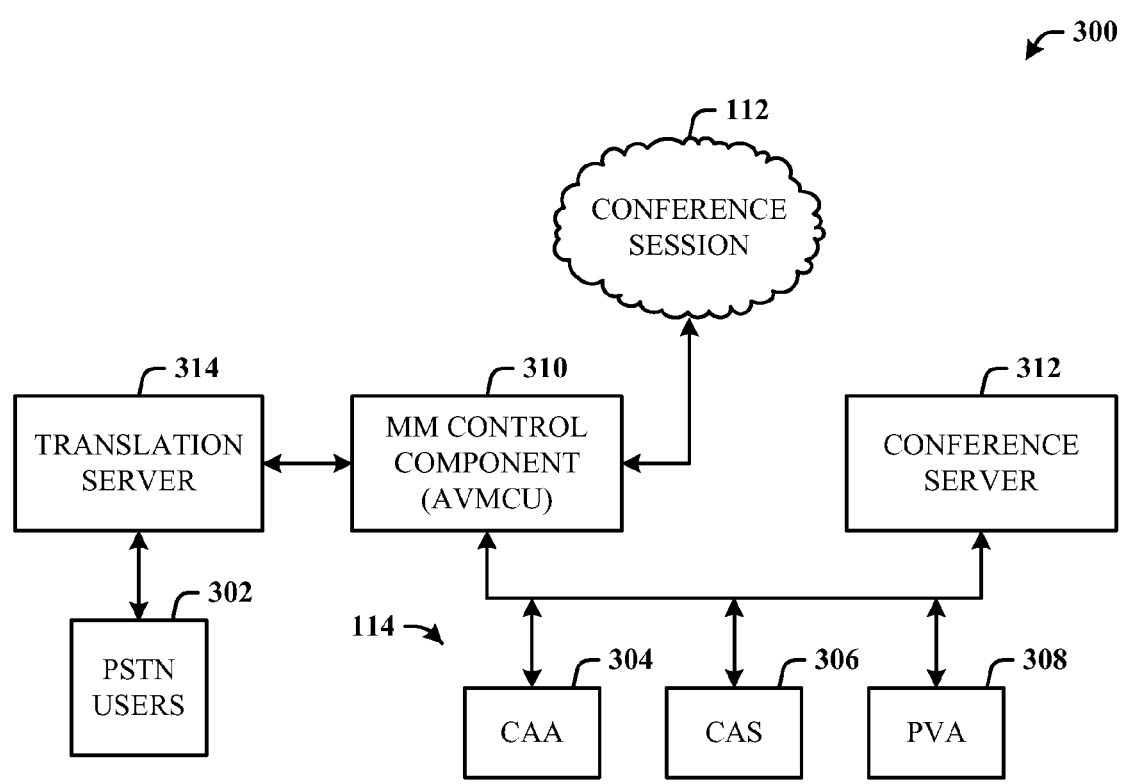
FIG. 3 illustrates a system for creating trusted services in a communications environment.

FIG. 3 illustrates a system 300 for creating trusted services in a communications environment. The system 300 accommodates PSTN (public-switch telephone network) users 302 for the conference session 112, which can be a voice-over-IP (VoIP) session. In this implementation, the services 114 include a conferencing auto attendant (CAA) service 304 that authenticates a PSTN phone user and transfers the PSTN phone user into the session 112, a conference announcement server (CAS) service 306 for playing conference announcements, and a personal virtual assistant (PVA) service 308 for translating user-initiated DTMF (dual-tone multi-frequency) signals into conference control commands. Note that other services can be provided to accommodate additional functionality for different types of users participating in the conference.

The CAA service 304, CAS service 306, and PVA service 308 are examples of the bot applications (clients). These services 114 can be brought into and released from service as desired. The session 112 is part of a multi-modal control component 310 (e.g., an audio-video multipoint control unit (AVMCU)) and a conference server 312. The PSTN users 302 access the session 112 via a translation server 314 (e.g., a mediation server).

The CAS service 306 is configured as a trusted service in the system 300. When a service is configured to be a trusted service, trust information is added that indicates that the service is a trusted entity in all the requests that the service sends. The presence of this trust information indicates that the service is a trusted service. When the CAS service 306 joins the conference session 112, the CAS service 306 provides the trust information to validate itself as a trusted entity. The conference server 312 then bypasses the regular authentication processes for trusted services and does not challenge for credentials.

When the conference session 112 is activated in the control component 310, an instance of the CAS service 306 is created and the CAS service 306 joins the conference session 112. Since the CAS service 306 is a trusted entity, the CAS service 306 can join the session 112 even if the session has been locked or if the session 112 is closed with a preset list of attendees. All the conference roster-related notifications that are sent out by the conference server 312 include the list of trusted entities in a separate container that is different from the container listing the regular users (non-trusted entities). This enables meeting clients (e.g., communications) to hide the information about bots from the other participants in the conference session 112. Alternatively, an implementation can be provided that does not send the notification to the normal users, but sends information about trusted entities only to other trusted entities.

Whenever a user joins or leaves the session 112, the conference roster is updated and the updated roster is sent to all the participants. This roster is also sent to the CAS service 306 as the CAS service 306 is joined to the conference. The CAS service 306 processes the roster to determine the users who have joined or left the session 112 and makes the appropriate announcement via the control component 310.

The CAA service 304 is another entity that is configured as a trusted service in the system 300. The CAA service 304 can be configured with a service URI of a server to which the CAA service 304 will communicate. When a user dials in via the PSTN, the call terminates at the translation server 314. The translation server 314 converts the information into a SIP format and communicates with the CAA service 304. The user is prompted to enter a phone extension and password. The CAA service 304 validates the extension and password with the conference server 312. The conference server 312 can trust this communications because the CAA service 304 is configured as a trusted service.

If the validation is successful, the CAA service 304 joins the session 112 on behalf of the user. The conference server 312 treats this request to join the session 112 as one originating from the user and applies the same rules that would be applied for the user. Thus, if the user is preset to be a presenter, the user is allowed into the session 112 even if the conference is locked. This example illustrates the ability of trusted services to perform conferencing operations on behalf of a user, in which case, superuser privileges are not assigned or granted.

Given the nature of the bot, a normal user is not allowed to perform operations on a trusted service. For example, if the normal user is allowed to perform operations, the normal user can remove a bot (e.g., CAA service 304, CAS service 306, PVA service 308) from the conference. This restriction is enforced by the conference server 312.

Figure 4:
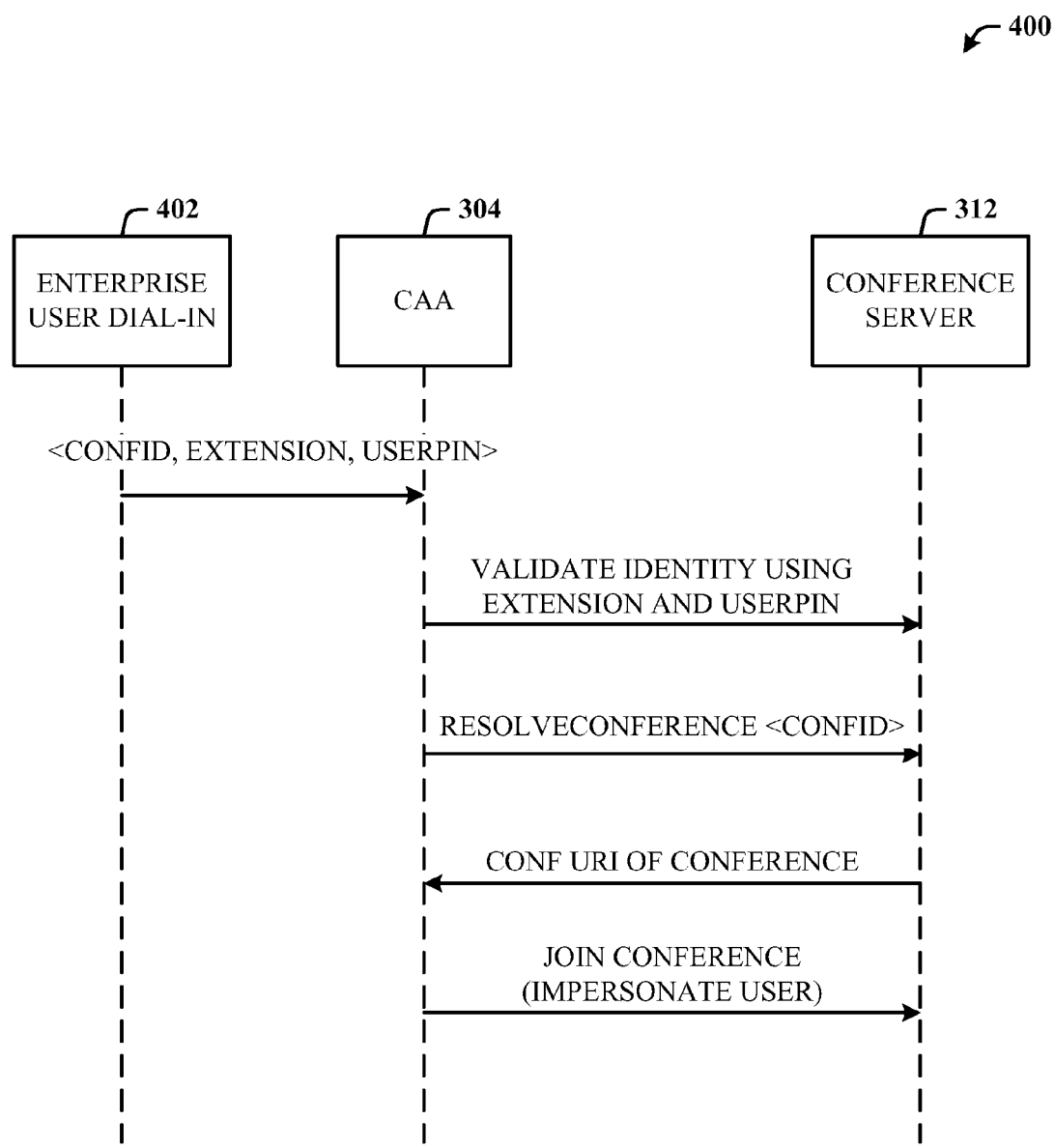

FIG. 4 illustrates a call flow diagram 400 for impersonating a PSTN user dial-in. At 402, the user dials-in to an enterprise. Information input by the user can include one or more of a conference ID, extension, and user PIN, is passed to the CAA service 304. The CAA service 304 then communicates with the conference server 312 to validate the user identity using the extension and user PIN. The CAA service 304 also communicates with the conference ID to the conference server 312 to determine the appropriate conference session for the dial-in user. The conference server 312 then returns the URI of the session to the CAA service 304, and the CAA service 304 then self-joins the conference on behalf of the dial-in user.

As a general, but non-inclusive summary, when a trusted service is installed, appropriate configuration settings are created in a network services component and an operating system interface. These settings enable messages that are sent from the trusted service to be trusted for routing and authentication. When the settings are present, the conference server does not request credentials to authenticate the service.

A trusted service can operate in at least an impersonation mode and a trusted service role mode. Impersonation of a user is where the service (e.g., CAA service) joins a conference session on behalf of a user. The conference server treats this request as having originated from the user being impersonated, and grants privileges based on the user being impersonated. For example, if a user joins via the CAA service and is configured to be presenter, then the privileges given are equivalent to that of a presenter. In this case, no special (superuser) privileges are given to the trusted entities. Additionally, the user information appears in the normal user portion of the conference roster.

Figure 5:
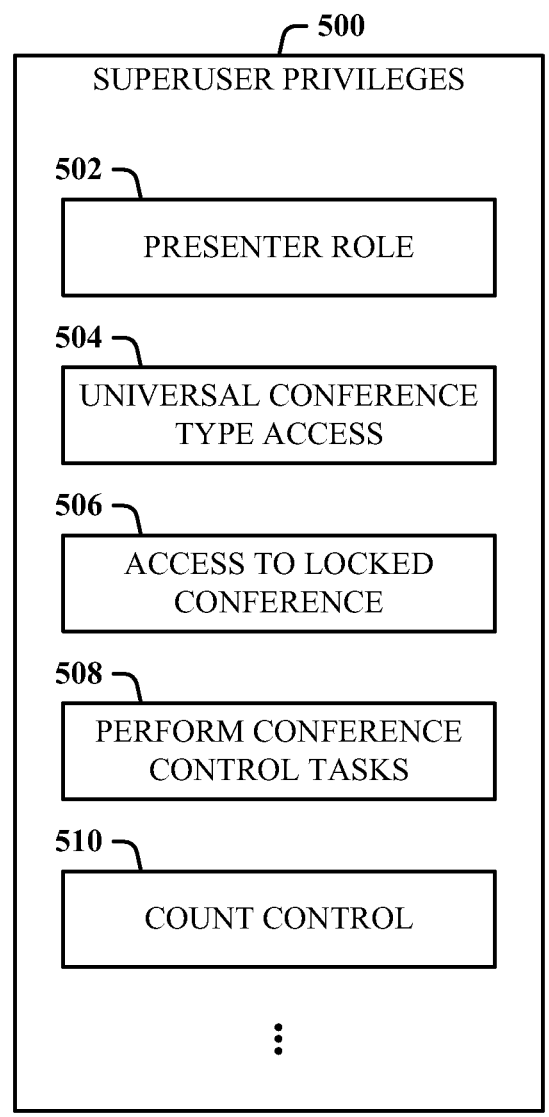
FIG. 5 illustrates an exemplary set of superuser privileges that can be employed for a trusted service.

FIG. 5 illustrated an exemplary set of superuser privileges 500 that can be employed for a trusted service. When requesting a trusted service role, this is not the trusted service impersonating the user, but the case of the CAS service joining session. The trusted service is given a special set of privileges, referred to as the superuser privileges 500. The superuser privileges include a presenter role 502, allowing entry into any conference irrespective of the type of the conference 504, allowing entry into locked conferences 506, the performance of conference control tasks such as locking a conference 508, and count control 510 by not counting towards participant count checks, for example. Other privileges can be utilized as desired.

When the service requests a trusted role, the information is propagated to all the control components (e.g., MCUs) for the conference. This allows the control component to identify the trusted services and give privileges deemed necessary.

The following restrictions can be enforced by the conference server for trusted entities. First, a regular user cannot request a trusted service role—only a trusted service that has been configured can request a trusted role. Second, a regular user cannot perform operations on a trusted entity even if the regular user is a presenter in the conference (a presenter, until now, could perform operations such as removing users from the conference).

The following implementations facilitate the above scenarios: the ability to configure a service as a trusted service;

protocol extensions that enable the trusted services to bypass the regular user authentication on the conference server (this causes the conference server to let requests originating from the trusted entities without a challenge for credentials), protocol extensions that enable the trusted services to request a trusted role, protocol extensions that enable the trusted services to impersonate a user, special handling of trusted entities (e.g., granting a predetermined set of privileges and bypassing regular checks), and separation of regular users from trusted entities in the conference roster notifications. This allows clients (e.g., CAA service, CAS service) to hide the presence of trusted entities from the users. This also enables legacy clients to have the same behavior as new clients without requiring any modifications (legacy clients only look at the regular user's container and so do not display the trusted entities in the conference).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
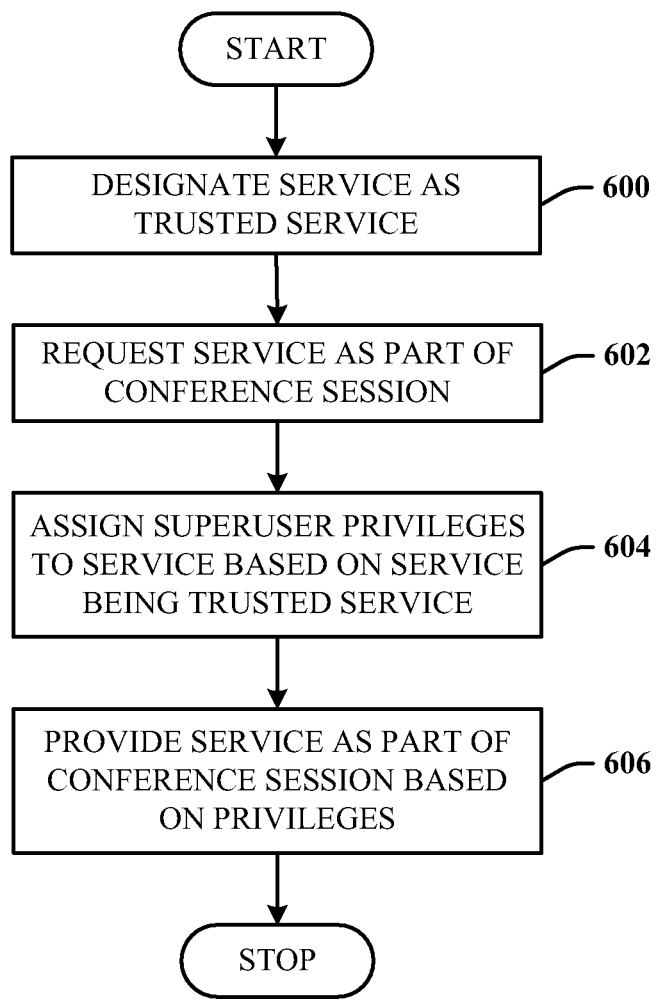
FIG. 6 illustrates a communications method in accordance with the disclosed architecture.

FIG. 6 illustrates a communications method in accordance with the disclosed architecture. At 600, a service is designated as a trusted service. At 602, the service is requested as part of a conferencing session. At 604, superuser privileges are assigned to the service based on the service being the trusted service, and not being utilized for user impersonation. At 606, the service is provided as part of the conference session based on the privileges.

Figure 7:
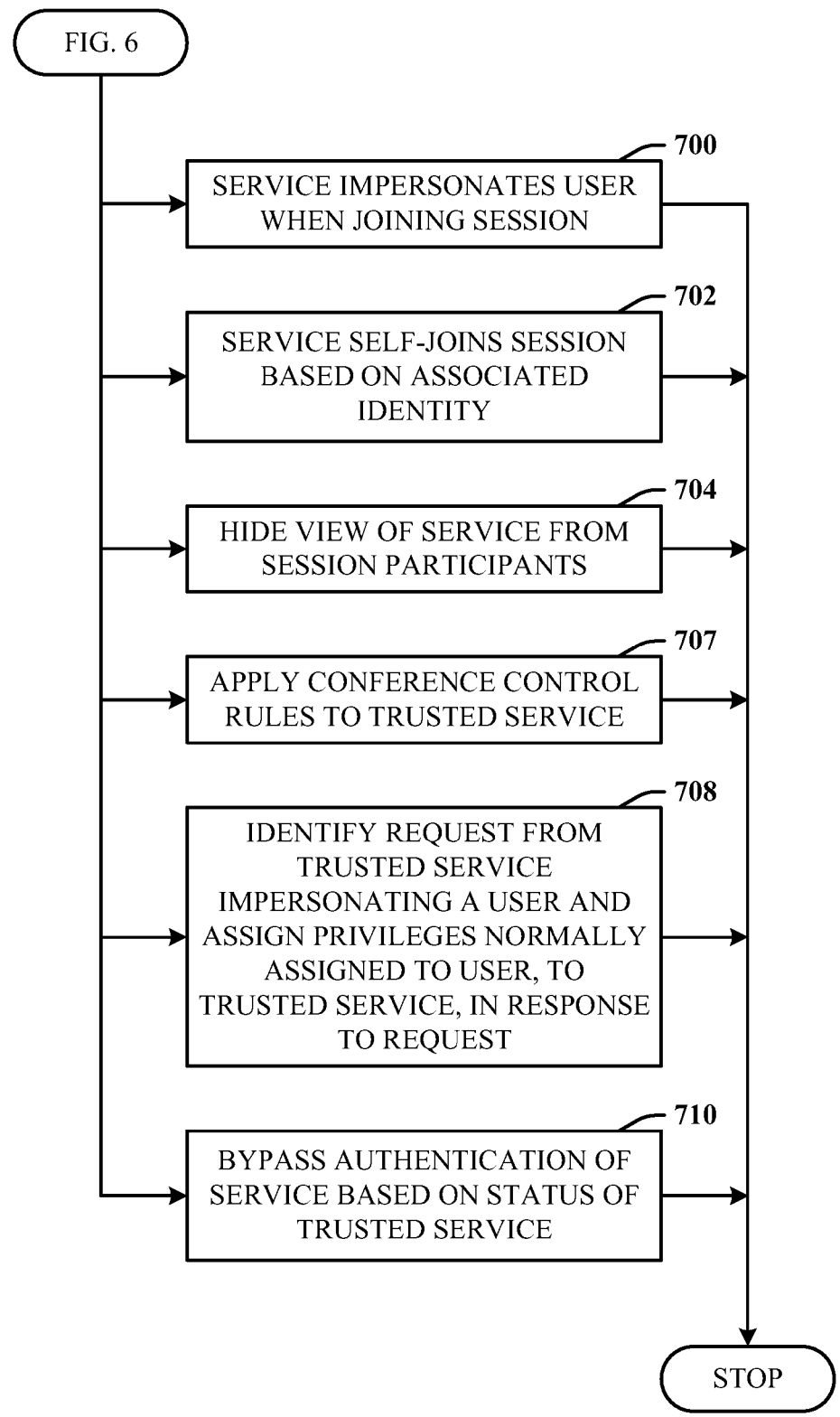
FIG. 7 illustrates additional alternative aspects for the method of FIG. 6.

FIG. 7 illustrates additional alternative aspects for the method of FIG. 6. At 700, the service impersonates a user when joining the session. At 702, the service self-joins the session based on an associated identity. At 704, the service is hidden from view of session participants. At 706, conference control rules are applied to the trusted service. At 708, the request is identified as from a trusted service that is impersonating a user and privileges normally assigned to the user are assigned to the trusted service in response to receiving the request. At 710, authentication of the service is bypassed based on status as the trusted service.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
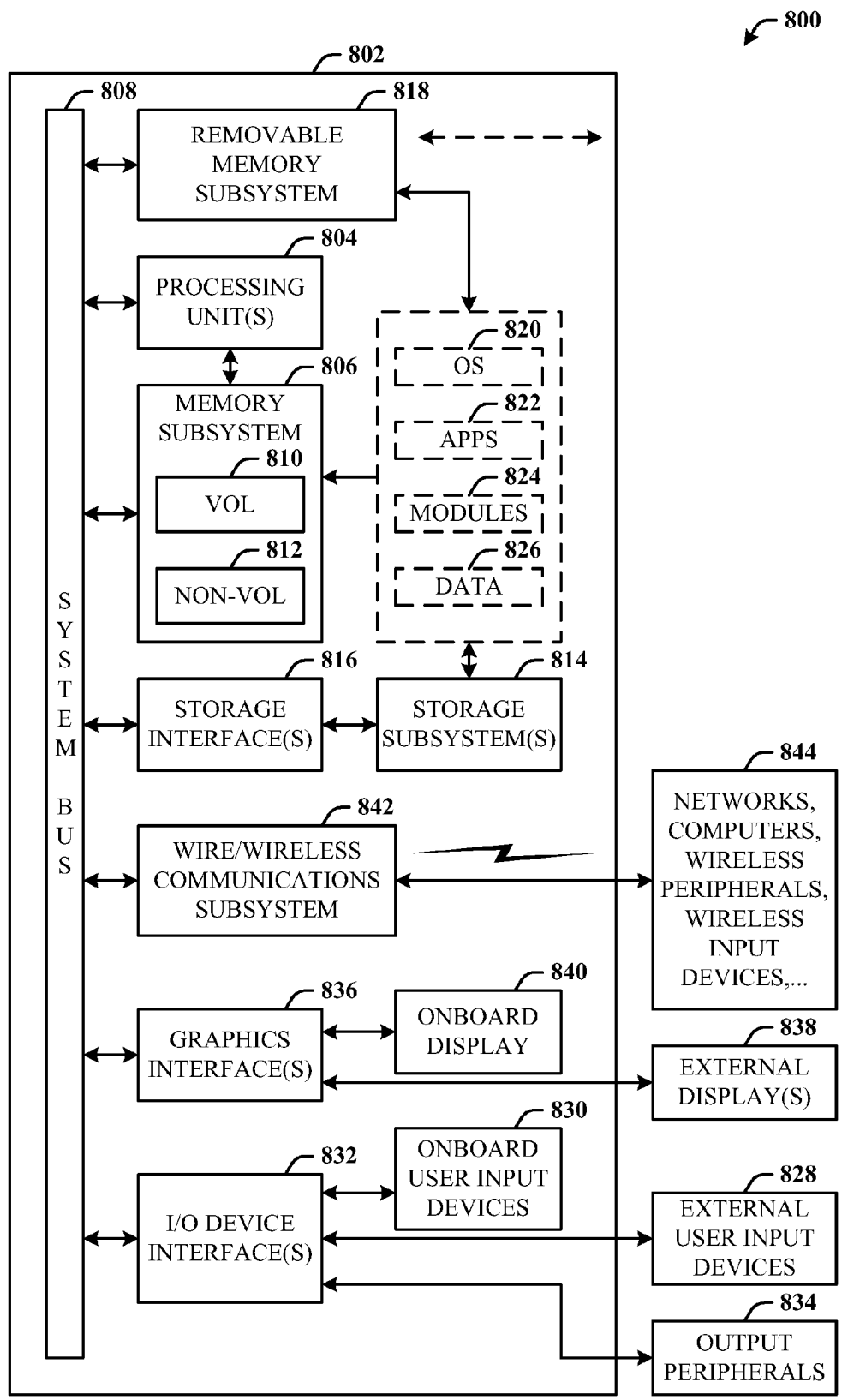
FIG. 8 illustrates a block diagram of a computing system operable to create and process trusted service and user impersonation in accordance with the disclosed architecture.

Referring now to FIG. 8, there is illustrated a block diagram of a computing system 800 operable to create and process trusted service and user impersonation in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826. The one or more application programs 822, other program modules 824, and program data 826 can include components and entities of system 100 of FIG. 1, the protocol component 200 of FIG. 2, the system 300 of FIG. 3, the call flow diagram 400 of FIG. 4, the superuser privileges 500 of FIG. 5, and the methods represented by the flowcharts of FIGS. 6-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
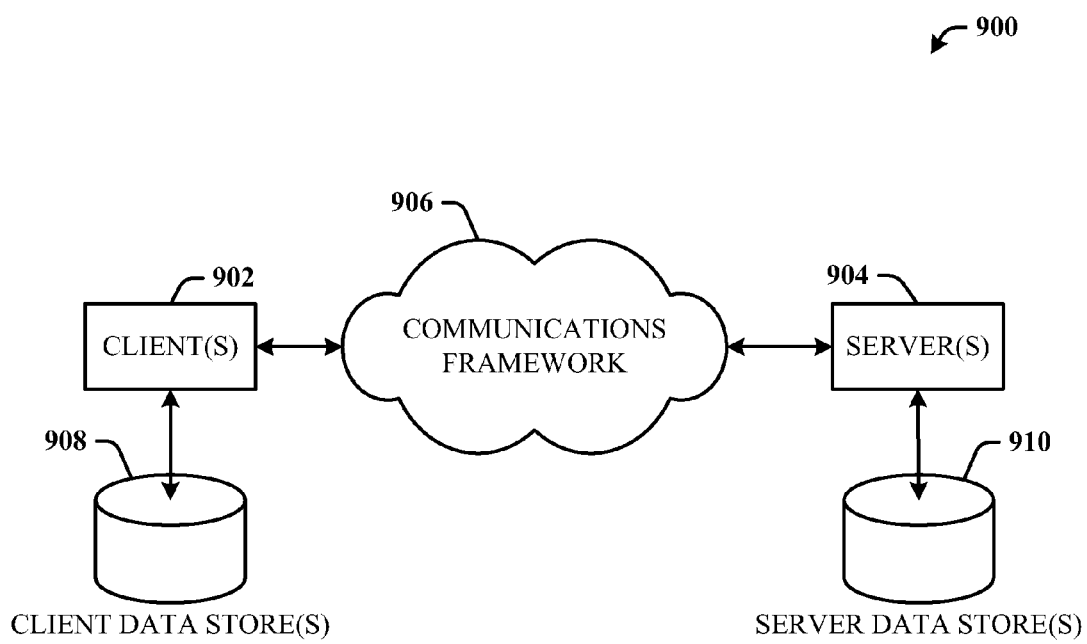
FIG. 9 illustrates a schematic block diagram of a computing environment that supports trusted services and impersonation.

Referring now to FIG. 9, there is illustrated a schematic block diagram of a computing environment 900 that supports trusted services and impersonation. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system, comprising:
   a conferencing component configured to:
   receive, from a service, a request to join a conference session,
   validate that the service, from which the request is received, is a trusted service, wherein one or more privileges are assigned to the service based on the validation,
   add the trusted service to the conference session in a first conference listing of service participants that is separate from a second conference listing of user participants for the conference session, wherein the first conference listing is hidden from at least one of the user participants and the second conference listing is provided to each of the user participants;
   process requests for the service based on the one or more privileges assigned to the service; and
   a processor that executes computer-executable instructions associated with at least one of the trust component or the conferencing component.

2. The system of claim 1, wherein the conferencing component is further configured to send a notification to only the service participants of the first conference listing.

3. The system of claim 1, wherein the conferencing component is further configured to assign superuser conferencing privileges to the service based on a validation of the service as the trusted service.

4. The system of claim 3, wherein the conferencing component is configured to use the assigned superuser conferencing privileges to add the trusted service to a locked conference session.

5. A method comprising:
   receiving, from a service, a request to join a conference session;
   validating that the service, from which the request is received, is a trusted service, wherein one or more privileges are assigned to the service based on the validation;
   adding the trusted service to the conference session in a first conference listing of service participants that is separate from a second conference listing of user participants for the conference session, wherein the first conference listing is hidden from at least one of the user participants and the second conference listing is provided to each of the user participants; and
   processing requests for the service based on the one or more privileges assigned to the service.

6. The method of claim 5, further comprising sending a notification to only the service participants of the first conference listing.

7. The method of claim 5, further comprising assigning superuser conferencing privileges to the service based on a validation of the service as the trusted service.

8. The method of claim 7, further comprising adding the trusted service to a locked conference session based on the assigned superuser conferencing privileges.

9. A non-transitory computer-readable medium including computer-executable instructions that, when executed by a computing device, cause the computing device to execute a method comprising:
   receiving, from a service, a request to join a conference session;
   validating that the service, from which the request is received, is a trusted service, wherein one or more privileges are assigned to the service based on the validation; and
   adding the trusted service to the conference session in a first conference listing of service participants that is separate from a second conference listing of user participants for the conference session, wherein the first conference listing is hidden from at least one of the user participants and the second conference listing is provided to each of the user participants; and
   processing requests for the service based on the one or more privileges assigned to the service.

10. The non-transitory computer-readable medium of claim 9, wherein the method further comprising sending a notification to only the service participants of the first conference listing.

11. The non-transitory computer-readable medium of claim 9, wherein the method further comprising assigning superuser conferencing privileges to the service based on a validation of the service as the trusted service.

12. The non-transitory computer-readable medium of claim 11, wherein the method further comprising adding the trusted service to a locked conference session based on the assigned superuser conferencing privileges.

\* \* \* \* \*